April 6, 1926.

O. HENKER

REFRACTOMETER

Filed June 6, 1924

1,579,532

Inventor:
Otto Henker

Patented Apr. 6, 1926.

1,579,532

UNITED STATES PATENT OFFICE.

OTTO HENKER, OF JENA, GERMANY, ASSIGNOR TO CARL ZEISS, OF JENA, GERMANY.

REFRACTOMETER.

Application filed June 6, 1924. Serial No. 718,287.

*To all whom it may concern:*

Be it known that I, OTTO HENKER, a citizen of Germany, and residing at Jena, Germany, have invented a new and useful Refractometer (for which I have filed an application in Germany June 14, 1923), of which the following is a specification.

In the apparatus for the objective determination of the refractive value in which an opaque mark is projected on the background of the eye as such is, e. g. the case in the apparatus described in the specification (see my co-pending application Serial Number 642,793), the observer sees the image of the mark on the light red background of the eye. Thereby the image, contrary to expectation, does not appear to him black but also reddish, though darker than the back ground of the eye, whereby the visibility of the image of the mark is impaired.

According to the invention the visibility of the image of the mark can be improved by inserting into the illuminating ray pencil of the apparatus a light-filter, whose colour is approximately complementary to that of the background of the eye and which is at the same time comparatively fairly transparent for white light, viz a green filter. In that case the image of the mark appears to the observer blackish on a light grey ground, whereby a greater contrast than hitherto may be attained. The arrangement is suitably made in such a way that one disposes on each apparatus several filters of somewhat different tint, which can be easily made operative or inoperative, e. g. by means of a revolver, in order to be able to also adjust the filter at any one time to the tint of the background of the eye just to be examined.

Figure 1:
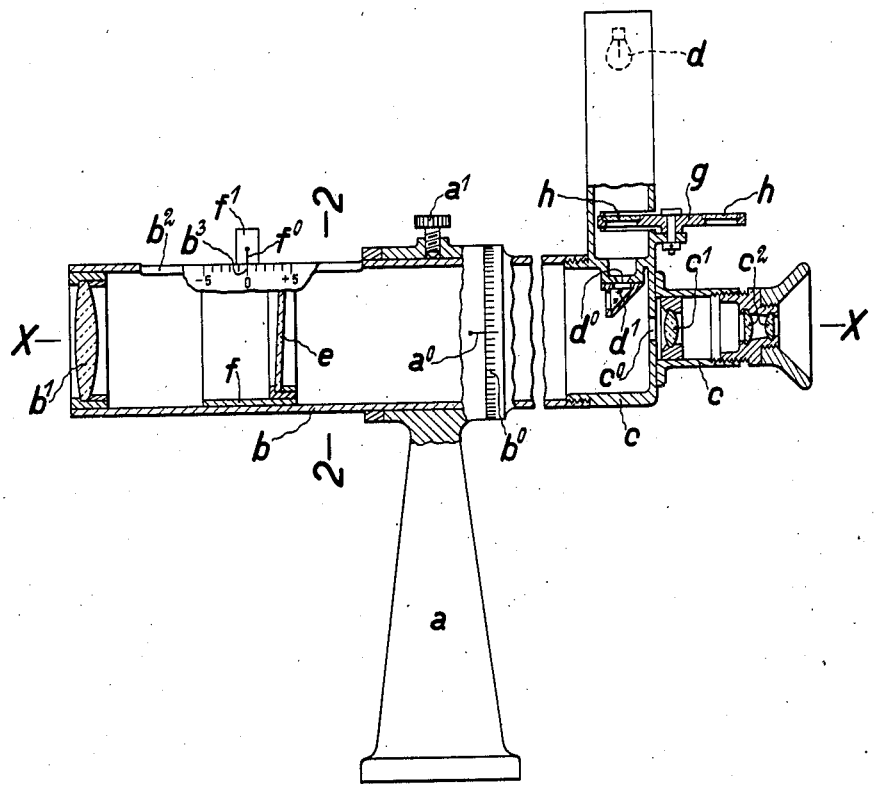
Figure 2:
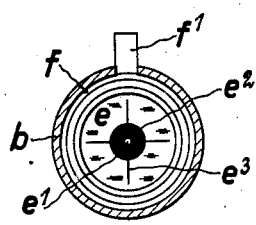

Figs. 1 and 2 of the annexed drawing show a constructional example of an apparatus according to the invention. Fig. 1 is a vertical section through the apparatus containing the optical axis. Fig. 2 is a cross section on the line 2—2 of Fig. 1.

In a standard $a$ there is supported a tube $b$ rotatable about its axis X—X. The tube can be fixed relatively to the standard $a$ by means of a screw $a^1$, whereby the position in which it is at any one time is indicated on a scale $b^0$ of the tube by an index $a^0$ of the standard. The tube $b$ contains at its one end a lens $b^1$ which serves for producing a real image of the background of the eye to be examined. At the other end of the tube $b$, viz within a casing $c$ screwed to the tube, is disposed a microscope serving for the observation of this image and having an objective $c^1$ fitted close behind a small circular diaphragm $c^0$ of the casing $c$ and an ocular $c^2$ fitted in a thread-mount, the distance of which ocular from the objective can be adjusted by rotating the ocular. For lighting up the background of the eye an illuminating device is provided, of which only the source of light $d$ is shown. The light emanating from this source of light enters the tube $b$ through a diaphragm $d^0$ after having traversed a prism $d^1$. The light opening $d^0$ is so positioned relatively to the diaphragm aperture $c^0$ that both openings are really imaged side by side in the eye-pupil by the lens $b^1$. Two concentric circles $e^1$ and $e^2$ and cross wires $e^3$, both arms of which intersect at the centre of both circles, are so traced on a glass plate $e$ that the centre of the circles lies in the axis of the lens $b^1$. The surface between the two circular marks $e^1$ and $e^2$ is blackened. The glass plate $e$ is inclined to the axis of the lens $b^1$ at an angle, slightly deviating from 90°. The glass plate $e$ is disposed in a bushing $f$ supported within the tube $b$ and provided with a member $f^1$ projecting through a slit $b^2$ of the tube $b$ which slit is parallel to the axis of the tube. The bushing can be displaced by means of the member $f$ in the axial direction of the tube $b$, whereby rotations of the bushing relatively to the tube are prevented by the said member. An index $f^0$ of the member $f^1$ indicates on a diopter scale $b^3$ of the tube $b$ the position adjusted at any one time of the mark system. A disk $g$ is rotatably supported below the source of light $d$ and provided with several green glass filters $h$ of somewhat different tint.

In order to examine an astigmatic eye the apparatus must be adjusted relatively to the eye to be examined in such a way that the image of the opening $d^0$ lies in the eye pupil. Hereupon the observer, by rotating the disc $g$, brings that glass filter $h$ into the path of rays, with the use of which he perceives the greatest contrast between the background of the eye and the image of the mark. Thereafter it is necessary to turn the tube $b$ into such a position that for the observer the one arm of the cross wires $e^3$ coincides with the image of it produced on the retina. This proves that the plane containing the axis of the lens $b^1$ and the centre of the opening $d^0$ coincides with one of the two principal sections of the eye. Thereupon it is necessary to displace the glass plate $e$, viz (in order to avoid a strain of accommodation of the patient) from its rear terminal position until the other arm of the cross wires coincides with the image of it produced on the retina. The patient is then required to continuously fix his eye upon the transparent opening of the circle $e^1$, and the ocular $c^2$ is adjusted by means of rotation in such a way that the observer clearly sees the retina. It is then possible to read off on the scale $b^0$ the meridian of the principal section examined and on the scale $b^3$ the refractive power which the correction spectacle-glass must have in this principal section. Thereupon the tube $b$ is rotated through 90° and the refractive power of the correction spectacle-glass, required for the other principal section, ascertained.

With an axially symmetrical eye a single ascertainment in an optional meridian is sufficient.

I claim:

1. In an apparatus for the purpose set forth a source of light, a collective lens system, a diaphragm located between the source of light and the lens system and adapted to be imaged by the lens system in the pupil of the eye to be observed, a mark located at the axis of the lens system and being displaceable along this axis, an observing device adapted to receive the light rays emanating from the source of light through the said diaphragm and reflected by the retina of the eye to be observed, a second diaphragm located in front of the observing device and adapted also to be imaged by the lens system in the said pupil, and a green filter interposed between the source of light and the lens system.

2. In an apparatus for the purpose set forth a source of light, a collective lens system, a diaphragm located between the source of light and the lens system outside of the axis of this system and rotatable about this axis and adapted to be imaged by the lens system in the pupil of the eye to be observed a pair of cross wires intersecting each other in the axis of the lens system and being rotatable about and displaceable along this axis, one or both arms of the cross wires coinciding with the plane containing the said axis and the centre of the said diaphragm, an observing device adapted to receive the light rays emanating from the source of light through the said diaphragm and reflected by the retina of the eye to be observed, a second diaphragm located in front of the abserving device and adapted also to be imaged by the lens system in the said pupil, a green filter interposed between the source of light and the lens system, and means adapted to jointly rotate the first named diaphragm and the pair of cross wires.

3. In an apparatus for the purpose set forth a source of light, a collective lens system, a diaphragm located between the source of light and the lens system outside of the axis of this system and rotatable about this axis and adapted to be imaged by the lens sytem in the pupil of the eye to be observed, a pair of cross wires intersecting each other in the axis of the lens system and being rotatable about and displaceable along this axis, one of both arms of the cross wires coinciding with the plane containing the said axis and the centre of the said diaphragm, a stop connected with the cross wires and covering the middle part of the same, an observing device adapted to receive the light rays emanating from the source of light through the said diaphragm and reflected by the retina of the eye to be observed, a second diaphragm located in front of the observing device and adapted also to be imaged by the lens system in the said pupil, a green filter interposed between the source of light and the lens system, and means adapted to jointly rotate the first named diaphragm and the pair of cross wires.

4. In an apparatus for the purpose set forth a source of light, a collective lens system, a diaphragm located between the source of light and the lens system outside of the axis of this system and rotatable about this axis and adapted to be imaged by the lens system in the pupil of the eye to be observed, a pair of cross wires intersecting each other in the axis of the lens system and being rotatable about and displaceable along this axis, one of both arms of the cross wires coinciding with the plane containing the said axis and the centre of the said diaphragm, a stop connected with the cross wires and covering the middle part of the same and containing a small opening, an observing device adapted to receive the light rays emanating from the source of light through the said diaphragm and reflected by the retina of the eye to be observed, a second diaphragm located in front of the observing device and adapted also to be imaged by the lens system in the said pupil, a green filter interposed between the source of light and the lens system, and means adapted to jointly rotate the first named diaphragm and the pair of cross wires.

5. In an apparatus for the purpose set forth a source of light, a collective lens system, a diaphragm located between the source of light and the lens system outside of the axis of this system and rotatable about this axis and adapted to be imaged by the lens system in the pupil of the eye to be observed, a pair of cross wires intersecting each other in the axis of the lens system and being rotatable about and displaceable along this axis, one of both arms of the cross wires coinciding with the plane containing the said axis and the centre of the said diaphragm, an observing device adapted to receive the light rays emanating from the source of light through the said diaphragm and reflected by the retina of the eye to be observed, a second diaphragm located in front of the observing device and adapted also to be imaged by the lens system in the said pupil, a plurality of green filters differing from each other with regard to their tint, a holder connecting the said filters, movably disposed at the apparatus and allowing of interposing one each of the filters between the source of light and the lens system, and means adapted to jointly rotate the first named diaphragm and the pair of cross wires.

6. In an apparatus for the purpose set forth a source of light, a collective lens system, a diaphragm located between the source of light and the lens system outside of the axis of this system and rotatable about this axis and adapted to be imaged by the lens system in the pupil of the eye to be observed, a pair of cross wires intersecting each other in the axis of the lens system and being rotatable about and displaceable along this axis, one of both arms of the cross wires coinciding with the plane containing the said axis and the centre of the said diaphragm, an observing device adapted to receive the light rays emanating from the source of light and through the said diaphragm and reflected by the retina of the eye to be observed, a second diaphragm located in front of the observing device and adapted also to be imaged by the lens system in the said pupil, a disc rotatably disposed at the apparatus, a plurality of green filters differing from each other with regard to their tint, the filter being inserted in the said disc and the disc allowing of interposing one each of the filters between the source of light and the lens system, and means adapted to jointly rotate the first named diaphragm and the pair of cross wires.

OTTO HENKER.